United States Patent [19]

Stollorz

[11] 4,204,235
[45] May 20, 1980

[54] SUPPORT ARM ASSEMBLY FOR LOADING/UNLOADING AND APPLYING A FORCE ON A FLYING HEAD

[76] Inventor: Herbert R. Stollorz, Redwood City, Calif.

[21] Appl. No.: 843,272

[22] Filed: Oct. 18, 1977

[51] Int. Cl.² .......................... G11B 5/60; G11B 5/48; G11B 17/32
[52] U.S. Cl. .................................... 360/103; 360/104; 360/105
[58] Field of Search .................. G11B/5/58; 360/103, 360/104, 128, 102, 121, 122, 130, 105

[56] References Cited

U.S. PATENT DOCUMENTS

| 3,528,067 | 9/1970 | Linsley et al. | 360/103 |
| 3,702,461 | 11/1972 | Cantwell | 360/103 |
| 3,812,535 | 5/1974 | Higgins et al. | 360/103 |
| 3,823,416 | 7/1974 | Warner | 360/103 |
| 3,896,494 | 7/1975 | Tamura | 360/103 |
| 3,896,495 | 7/1975 | Beecroft | 360/103 |
| 3,927,252 | 12/1975 | Polley | 360/103 |
| 3,931,641 | 1/1976 | Watrous | 360/103 |
| 3,936,881 | 2/1976 | Orlando | 360/103 |
| 4,034,412 | 7/1977 | Smith | 360/103 |

Primary Examiner—Alfred H. Eddleman
Attorney, Agent, or Firm—Paul F. Schenck

[57] ABSTRACT

An electromagnetic transducer head arm having a plurality of transducer cores increases storage capacity and data access of disk storages. Airbearing skis generate air pressure between the disk surface and a counter force applied by the head arm.

3 Claims, 10 Drawing Figures

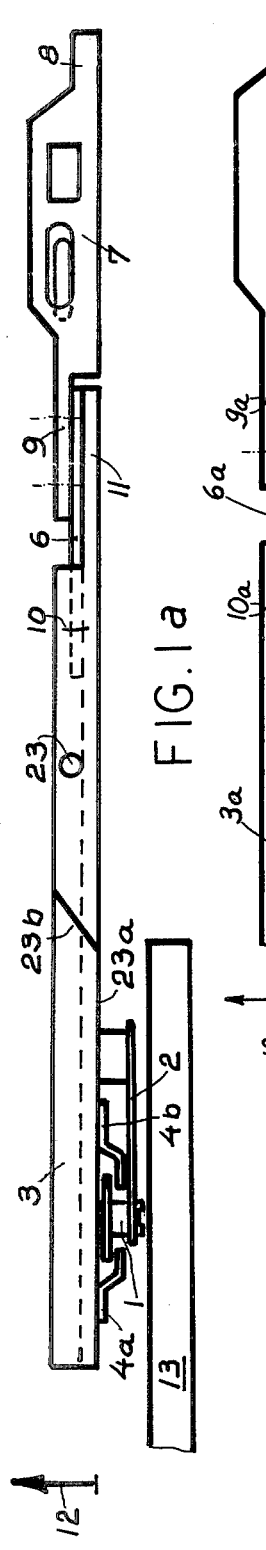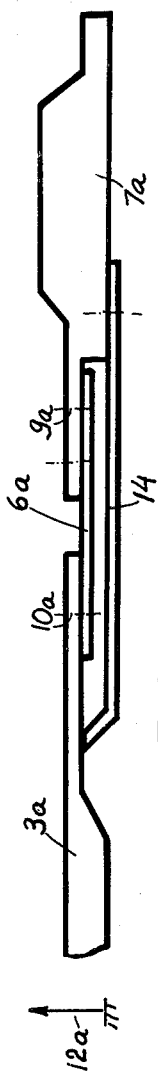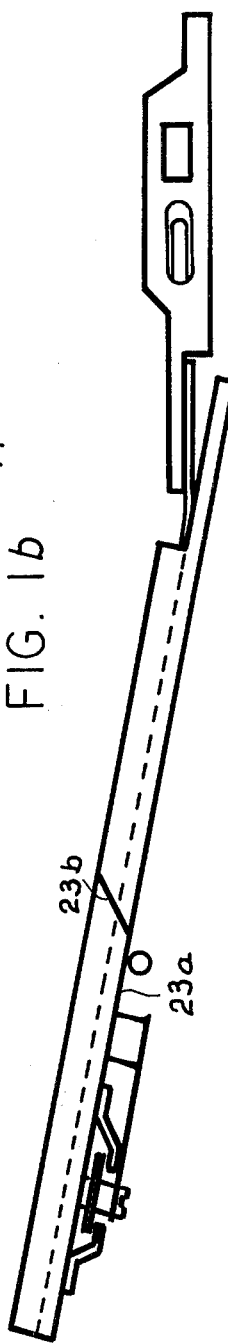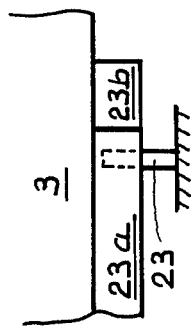
FIG. 1a
FIG. 1b
FIG. 2

SUPPORT ARM ASSEMBLY FOR LOADING/UNLOADING AND APPLYING A FORCE ON A FLYING HEAD

BACKGROUND OF THE INVENTION

It is a continuous effort of the computer industry to improve the storage capacity and the operating characteristics of storage facilities of digital computers. Various steps have been taken to increase storage capacity of rotating disk storages. Recording data at higher recording densities within the storage tracks, and reducing the track width and track spacing are two of the most often used approaches for improving storage capacities. However, changing the recording and track densities require modification of the transducer-disk interface. Furthermore, changing the track density requires additional modification of the actuator mechanism, which moves the transducer across the disk storage surface to the desired tracks. None of these methods allow to upgrade a disk storage in the field. In general the user has to exchange the storage facility in order to upgrade his system.

SUMMARY OF THE INVENTION

It is an object of the invention to provide means for increasing storage capacity of certain disk storages.

It is an object of this invention to provide means for upgrading storage facilities on site.

It is another object of this invention to simplify the control of transducer arm movement during head loading.

It is another object of this invention to provide for a new type of low-flying transducer head.

DESCRIPTION OF THE INVENTION

The present invention relates to digital storages, especially to disk storages using tranducer heads flying at close proximity to the storage surface on an airstream generated by the rotating storage disk. In order to have the transducer head fly at a distance of 50 microns or less above the surface of the storage disk the transducer core is attached to a body having a contoured face opposite the disk surface. The contour includes one or more polished operating surfaces with curvatures, known as airbearing skis. The flight of a transducer head, the combination of one or more transducer cores and a body, is controlled by the air pressure generated between the airbearing skis and the disk surface, and a counter force applied by the head arm through suitable means to the transducer head.

It is desirable to record data at high density in narrow tracks. However, recording density and track width are limited by the means used for recording and reproducing data. Furthermore, precautions have to be taken to prevent loss of stored data due to physical damage to the storage surface and/or the transducer head.

The present invention departs from the above standard methods of improving recording and track densities. The transducer head of the present invention carries two transducer cores separated by a square body with airbearing skis in tangential direction to the movement of the accessed storage track relative to the transducer head. Each one of the magnetic cores has a gap for recording and sensing data on an accessed storage track. The transducer cores are mounted on the sides of the body parallel and adjacent to the airbearing skis in such a way that the airbearing skis of the core separating body and the operating surfaces of the attached cores form a combined operating surface. The width of the gaps are determined by the width of the core slices at the surface opposing the disk storage surface. A new method of edgelapping is used to reduce the width of the core slices at the operating surface to a value producing a track width of desired value.

The width of the core separating body is a multiple of the track spacing minus the width of one transducer core gap. In every position of the head arm is controlled by the actuator, data can be recorded or sensed selectively in two tracks. Therefore the storage capacity of a storage disk can be doubled by replacing the regular single track access head arm by a dual track access head arm of the present invention. The actuator and its control do not have to be changed. Selection between the two accessed tracks is done electronically by selecting the proper one of the two transducer cores.

The transducer head is mounted in a flexure giving elastic movement in a direction substantially perpendicular to the surface of the disk storage, and around two axes to adapt to the contour of the storage surface. The flexure is connected by a head arm to an actuator, which moves the transducer head across the disk surface to access desired storage tracks. A loading ramp is provided for lifting the transducer head from close proximity to the storage surface to a safe distance from the storage surface when moving the transducer head away from the storage disk.

During operation the transducer head is springloaded in the direction towards the storage surface. The total movement of the transducer head perpendicular to the storage surface is limited by a head lifter arrangement. By reducing the springload and the lift by the airbearing skis potential damage to the storage disk in case of a head landing is significantly reduced.

BRIEF DESCRIPTION OF THE DRAWINGS

FIG. 1a is a side view of a transducer head arm of the present invention in loaded position.

FIG. 1b is a sectional view of another transducer head arm of the present invention having a different type of linkage.

FIG. 2 is a side view of the transducer head arm of FIG. 1a in unloaded position.

DESCRIPTION OF THE PREFERRED EMBODIMENTS

Figure 3:
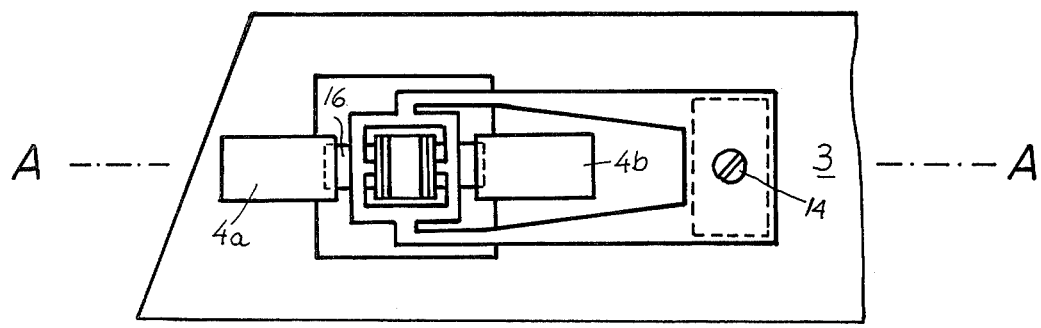
FIG. 3 is a detailed illustration of the head-head arm interface.

FIG. 1a is a side view of the transducer head arm assembly of the present invention. The assembly includes the transducer head 1, flexure 2, head arm 3, head lifters 4a and 4b, spring 5, linkage 6, and T-Block connector 7. The far end 8 of T-Block connector 7 is of a type and shape which allows the connection of the assembly to a T-Block of a desired type. The flat end 9 of T-Block connector 7 carries linkage 6, a flat rectangular piece of elastic material. Head arm 3 is connected to linkage 6 by two screws at location 10. Head arm 3 reaches with tongue 11 under flat end 9 of T-Block connector 7. This arrangement allows to lift head arm 3 in a direction as indicated by arrow 12 by bending linkage 6. Any movement of head arm 3 from its straight position as shown in FIG. 1a against arrow 12 is inhibited. This straight position is the operative position of head arm 3 for recording and sensing data in a track of storage disk 13. The lifted position of head arm 3 in the direction of arrow 12 is the unloaded, inoperative position, see FIG. 2.

FIG. 1b is a schematic illustration of a different linkage between T-Block connector 7a and head arm 3a. Head arm 3a and T-Block connector 7a are connected by linkage 6a, which is made of an elastic material of suitable strength. Movement of head arm 3a against a direction of arrow 12a is inhibited by stop lever 14a, which is affixed to T-Block connector 7a. In the loaded, operative position head arm 3a is supported by stop lever 14a at position 15a.

Figure 4:
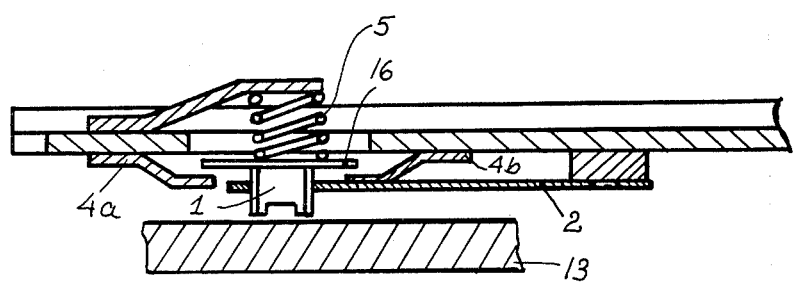
FIG. 4 is an illustration of a cross-section of the head-head arm interface.

FIG. 3 is a more detailed illustration of the head-head arm interface. FIG. 4 is an illustration of a cross-section of the assembly at location A-A. Transducer head 1 is affixed to flexure 2, which in turn is connected to head arm 3 by screw 14. A spring 15 loads transducer head 1 towards storage disk 13, which is shown in FIG. 4. Travel of transducer head 1 relative to head arm 3 is limited by head lifters 4a and 4b and plate 16, which is attached to transducer head 1. As long as transducer head 1 is not sufficiently close to the surface of storage disk 13 for flying at close proximity, transducer head 1 will rest with plate 16 on head lifters 4a and 4b. As soon as during the head loading operation transducer head 1 gets into operative proximity to the surface of storage disk 13, the air pressure developing under airbearing skis 44 and 45 (FIG. 5) will lift transducer head 1 off the head lifters 4a and 4b, at which time transducer head 1 starts flying at a desired distance above the surface of storage disk 13.

The unloaded position of the head arm assembly of FIG. 1 is shown on FIG. 2. Head arm 3 is loaded and unloaded by relative movement between loading pin 23 and head arm 3. During such a relative movement pin 23 will ride on ramp 23a and allow head arm 3 to change from unloaded position to loaded position and vice versa while pin 23 rides on ramp section 23b. Loading and unloading head arm 3 has to happen while head 1 is still above the surface of storage disk 13.

Figure 5A:
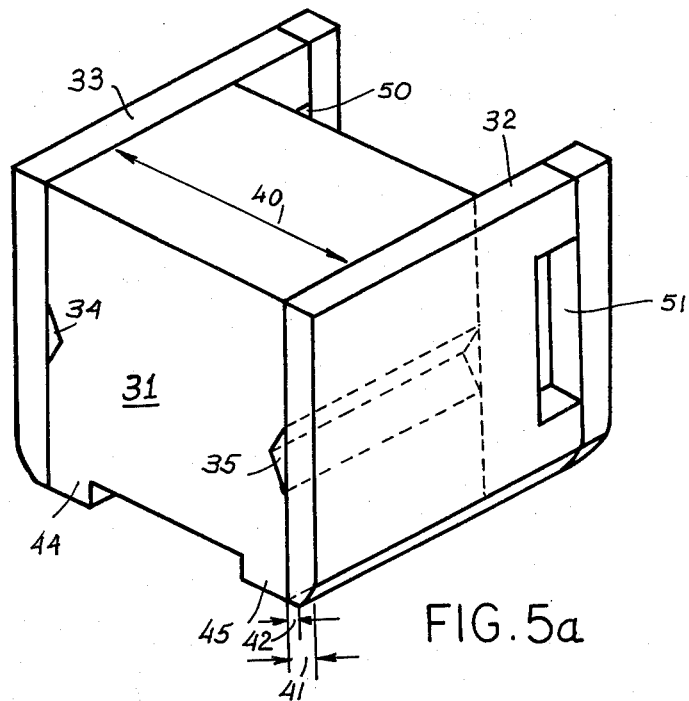
FIG. 5a is an illustration of a dual core transducer head.

FIG. 5a is an illustration of transducer head 1. Transducer head 1 is assembled from an AL-Ceramic body slider 31 and two transducer core slices 32 and 33. Body slider 31 includes airbearing skis 44 and 45 with operating surfaces 48 and 49. The operating surfaces 46 and 47 of core slices 32 and 33 extend the operating surfaces 48 and 49 of air-bearing skis 44 and 45 to a size sufficient to provide the necessary lift for flying the transducer head 1 at a desired distance above the surface of storage disk 13 against the loading force exercised by spring 5 on transducer head 1.

Figure 5B:
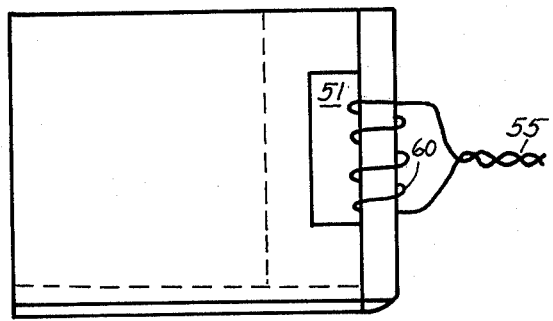
FIG. 5b is a side view of a dual core transducer head.

Core slices 32 and 33 include openings 50 and 51 providing space for the sense and record coils, of which coil 60 is indicated in FIG. 5b.

Prior to the attachment of core slices 32 and 33 the width 40 of body slider 31 is machined to the desired value. After placing core slices 32 and 33 left and right of slider body 31 an adhesive of an epoxy type is injected in grooves 34 and 35, whereby core slices 32 and 33 are permanently attached to body slider 31.

Figure 6A:
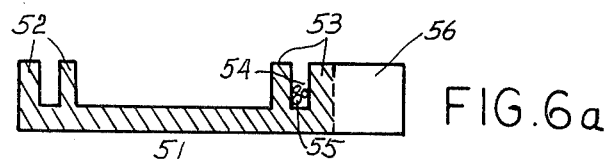
FIGS. 6a, 6b, 6c are cross-sections of different types of head arms.
Figure 6B:
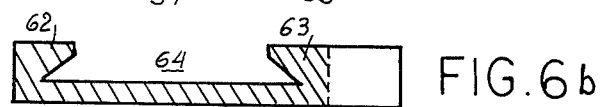
Figure 6C:
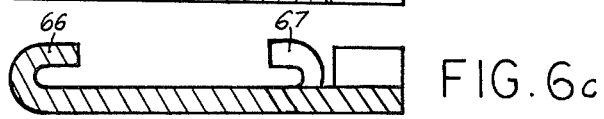

FIGS. 6a, 6b, and 6c are cross-sections of different head arms, which can be used as head arm 3 in FIG. 1. FIG. 6 is a first embodiment of a head arm. The flat main section 51 and the side walls 52 and 53 provide the essential stiffness against deformation when the arm is unloaded under the preload of linkage 6. A channel 54 is provided in side wall 53 to carry signal wires 55 of transducer head 1. The unshaded area 56 is the area of loading ramp 23b. The flat end 9 of T-Block connector 7 and linkage 6 are placed inside the extrusion between side walls 52 and 53.

FIG. 6b is another embodiment of a head arm. The head arm of which a cross-section is shown in FIG. 6b has a dovetail like channel 64 on the inside of side walls 62 and 63. Either channel can be used to carry signal wires 55.

FIG. 6c is a third embodiment of a head arm which can be used in place of head arm 3 of FIG. 1. The side walls 66 and 67 are formed by bending the outer edges of the head arm to U-shaped channels. Either one of the channels in side walls 66 and 67 can be used to carry the signal wires 55 of transducer head 1.

The signal wires placed in the channels provided in side walls 52 and 53, 62 and 63, 66 and 67, respectively, of the head arms shown in FIGS. 6a, 6b, and 6c can be held in place by application of adhesive means, or by crimping the opening of the channel in one or more places along the channel.

While there have been shown and described and pointed out the fundamental novel features of the invention with reference to the preferred embodiments, it will be understood by those skilled in the art that various changes in the form and details of the arrangements illustrated and its manufacturing steps may be made without departing from the spirit and scope of this invention.

What I claim is:

1. In a transducer support assembly having a connector for mounting said assembly to an actuator of a disk storage drive, and transducer means for reading or writing on a storage disk of said disk storage drive, including at least one transducer head with at least two airbearing skis, an improved head arm loading arrangement, comprising:

a support arm;

first flexing means interconnecting said support arm and said connector;

second flexing means interconnecting said support arm and said transducer means;

said first flexing means providing movement of said arm relative to said connector in a first plane substantially perpendicular to said storage disk;

said second flexing means providing movement of said transducer means relative to said arm in a second plane substantially perpendicular to said storage disk;

means for tilting said arm between a first, operative position and a second, inoperative position;

first restraining means defining said first operative position and limiting further movement of said arm towards said storage disk;

second restraining means providing for limited movement of said transducer means in said second plane for flying in operative proximity to said storage disk when said support arm is in said operative position.

2. An improved head arm loading arrangement as claimed in claim 1, wherein said second restraining means include:
- a head lifter plate connected to said transducer means, and head lifter means connected to said support arm;
- whereby said head lifter plate and said head lifter means engage while said support arm is not in operative position.

3. An improved head arm loading arrangement as claimed in claim 1, wherein said second restraining means further include:
- a spring, connecting said transducer means and said support arm,
- whereby said air-bearing skis of said transducer means generating a lift force on said transducer means against said spring for flying said transducer means in operative proximity to said storage disk when said support arm is in operative position.

* * * * *